US011206682B2

(12) United States Patent
Christoffersson et al.

(10) Patent No.: US 11,206,682 B2
(45) Date of Patent: Dec. 21, 2021

(54) METHODS AND DEVICES FOR SCHEDULING GROUP UPLINK COMMUNICATION

(71) Applicant: Telefonaktiebolaget LM Ericsson (publ), Stockholm (SE)

(72) Inventors: Jan Christoffersson, Luleå (SE); Mårten Ericson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/330,226

(22) PCT Filed: Jul. 4, 2017

(86) PCT No.: PCT/EP2017/066690
§ 371 (c)(1),
(2) Date: Mar. 4, 2019

(87) PCT Pub. No.: WO2019/007491
PCT Pub. Date: Jan. 10, 2019

(65) Prior Publication Data
US 2019/0208539 A1    Jul. 4, 2019

(51) Int. Cl.
*H04W 72/14*      (2009.01)
*H04W 72/04*      (2009.01)
(Continued)

(52) U.S. Cl.
CPC ........... *H04W 72/14* (2013.01); *H04L 1/0045* (2013.01); *H04W 4/06* (2013.01); *H04W 72/042* (2013.01);
(Continued)

(58) Field of Classification Search
CPC .................................................. H04W 72/14
See application file for complete search history.

(56) References Cited

U.S. PATENT DOCUMENTS

2008/0064407 A1\* 3/2008 Miller ................... H04W 84/22
455/442
2009/0175214 A1\* 7/2009 Star ..................... H04B 7/15592
370/315
(Continued)

FOREIGN PATENT DOCUMENTS

WO    2015 163798 A1    10/2015
WO    2016 128847 A1     8/2016
WO    2017 182068 A1    10/2017

OTHER PUBLICATIONS

3GPP TR 36.746 v1.0.0; Technical Report; 3rd Generation Partnership Project; Technical Specification Group Radio Access Network; Study on further enhancements to LTE Device to Device (D2D), User Equipment (UE) to network relays for Internet of Things (IoT) and wearables (Release 15)—Jun. 2017.
(Continued)

*Primary Examiner* — Jason E Mattis
(74) *Attorney, Agent, or Firm* — Baker Botts, LLP

(57) ABSTRACT

Group transmission of data from a group of User Equipment devices to a network node of a cellular communication system where communication between devices is effected by device-to-device technology can provide significant improvements in uplink coverage and user bit rate. However, the benefits of group transmission means that not all devices of a group have sufficient network coverage to reliably receive a grant signal scheduling uplink resources from a network node. Methods, devices and a network node are proposed that enable the dynamic selection of either a direct grant mode, in which each device receives the uplink grant directly from the network, or a relayed grant mode, in which a device acting as group coordinator relays the grant to all members of the group, to ensure optimal performance for group transmissions. The selection is dependent on at least one determined condition relating to the group of
(Continued)

devices and/or the group transmission. The group transmission is made by the group devices and received by the network node with a delay associated with the selected grant mode.

11 Claims, 9 Drawing Sheets

(51) Int. Cl.
    *H04L 1/00*     (2006.01)
    *H04W 4/06*     (2009.01)
    *H04W 72/12*     (2009.01)
    *H04W 88/04*     (2009.01)

(52) U.S. Cl.
    CPC ..... *H04W 72/121* (2013.01); *H04W 72/1289* (2013.01); *H04W 88/04* (2013.01)

(56) References Cited

U.S. PATENT DOCUMENTS

| | | | |
|---|---|---|---|
| 2013/0029680 A1 | 1/2013 | Park et al. | |
| 2013/0107851 A1* | 5/2013 | Park | H04B 7/026 370/329 |
| 2013/0132788 A1* | 5/2013 | Braun | H04L 1/1819 714/750 |
| 2016/0242011 A1 | 8/2016 | Ericson et al. | |
| 2017/0318586 A1* | 11/2017 | Wang | H04W 72/0453 |

OTHER PUBLICATIONS

3GPP TR 38.913 v14.0.0; Technical Report; 3rd Generation Partnership Project; Technical Specification Group Radio Access Network; Study on Scenarios and Requirements for Next Generation Access Technologies (Release 14)—Oct. 2016.

UL Group Transmission Concept; D2D with simultaneous UL group transmission by Marten Ericson et al.—Jun. 11, 2015.

Metis II, Mobile and wireless communications Enablers for the Twenty-twenty Information Society—II, Deliverable D5.2; Final Considerations on Synchronous Control Functions and Agile Resource Management for 5G, Version v1.0—Mar. 31, 2017.

3GPP TSG RAN WG1 Meeting #86; Gothenburg, Sweden; Source: Huawei, HiSilicon; Title: Sidelink Support & Enhancements for NR (R1-167207)—Aug. 22-26, 2016.

International Search Report for International application No. PCT/EP2017/066690—dated Mar. 5, 2018.

\* cited by examiner

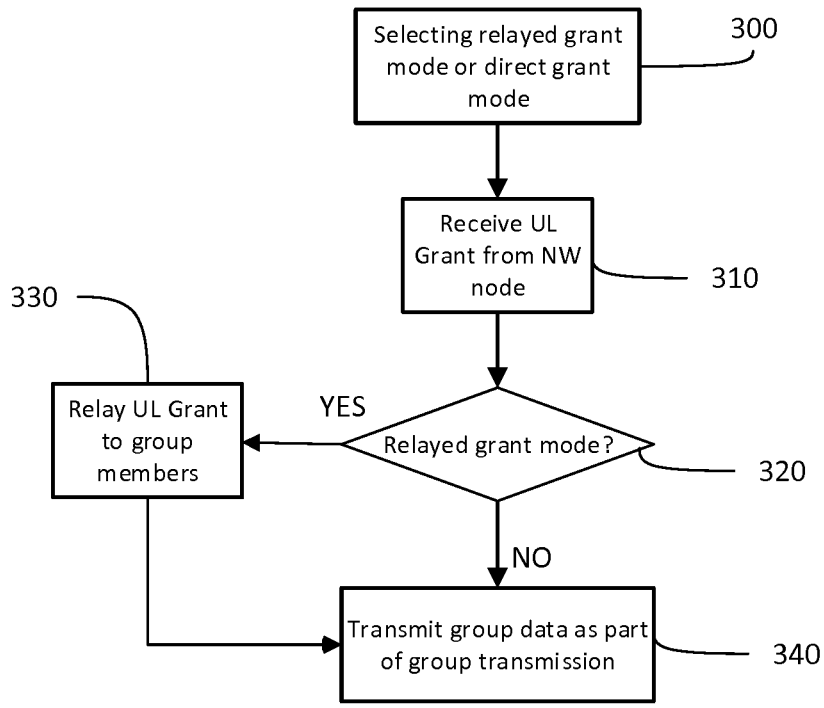
Fig. 6
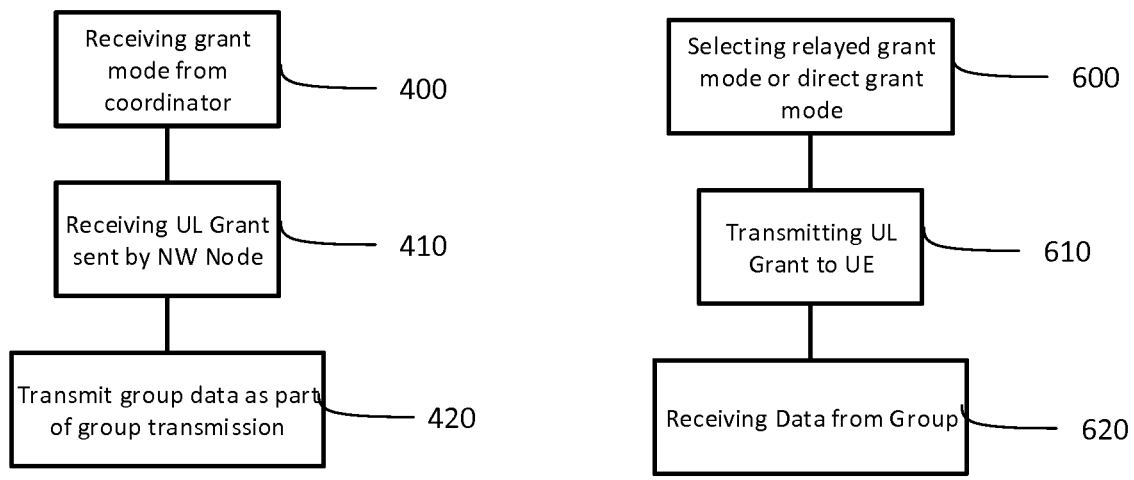
Fig. 7
Fig. 8

METHODS AND DEVICES FOR SCHEDULING GROUP UPLINK COMMUNICATION

PRIORITY

This nonprovisional application is a U.S. National Stage Filing under 35 U.S.C. § 371 of International Patent Application Serial No. PCT/EP2017/066690 filed Jul. 4, 2017 and entitled "METHODS AND DEVICES FOR SCHEDULING GROUP UPLINK COMMUNICATION" which is hereby incorporated by reference in its entirety.

TECHNICAL FIELD

The present disclosure relates generally to group transmissions from a group of devices to a wireless telecommunications network. It has specific relevance to the scheduling of such uplink group transmissions using device-to-device or sidelink communication.

BACKGROUND

Device-to-Device (D2D) communication, or sidelink communication, is a peer to peer link which does not use the wireless network infrastructure but enables devices, such as User Equipments (UE) of a mobile communications network to communicate directly with one another when they are in close proximity. D2D communication is expected to play an important role in future radio access technologies by improving spectrum utilization, overall throughput and energy efficiency. It can also enable new peer-to-peer and location-based applications and services and provide backup for public service networks, for example, when the latter fail or are unavailable. In fact, the "3rd Generation Partnership Project; Technical Specification Group Radio Access Network; Study on Scenarios and requirements for Next Generation Access Technologies; (Release 14), 3GPP TR 38.913, V14.0.0 (2016-10) specifies that the radio access network (RAN) architecture shall support operator-controlled sidelink (D2D) operation, both in network coverage and out of coverage, and also shall provide D2D support for Public Safety.

One manner in which D2D communication, or "cooperative" D2D, can improve the network uplink coverage and user bit rate is in group transmissions. This is when a group of UEs operate collectively as an antenna array to transmit data that stems from one of the UEs. WO 2015/163798 describes a scheme wherein an individual UE wishing to transmit data to a network node of a mobile telecommunications network initially transmits data to other UEs in a group. All UEs in the group then transmit the same data jointly to the network using a group ID.

FIG. 1a illustrates the concept of group transmission using D2D communication. In the figure are depicted three UEs, 10, 12, 14 and a radio network node 20, that acts as a network node, such as an eNodeB (eNB), or access point. The three UEs, 10, 12, 14 have formed a group and one UE, in the present case UE 10 has been designated group coordinator. When UE 14 wishes to transmit uplink data to the network, it sends the data to the other members of the group, 10, 12 using D2D or sidelink communication as illustrated by the dash-dotted arrows between UE 14 and UEs 10, 12. Thereafter the same data is transmitted jointly in a synchronized fashion to the network node 20 as depicted by the double-line arrows. The network node 20 perceives the transmission as if it originated from a single UE. In FIG. 1a, downlink control data is received by the coordinator UE 10 as illustrated by the single-line arrow. The coordinator then forwards this data to the other UEs of the group, 12, 14, as shown by the single line arrows between UE 10 and UEs 12, 14.

The advantage of uplink group transmission is that the signal-to-interference-plus-noise ratio, (SINR) for each UE in the group is added. In other words, when the SINR of an uplink transmission for a single UE is $SINR_{singletx}$ and the number of UEs in the group is GroupSize, the SINR for the group transmission is $SINR_{gouptx}$ can be expressed as follows:

$$SINR_{grouptx} = \sum_{u}^{GroupSize} SINR_{singletx}(u)$$

This is especially beneficial when the SINR is low in a particular area or when the UE desiring to send the data has a low SINR or is even out of UL coverage and the other UEs in the group have a higher SINR. The SINR from the group transmission is typically considerably higher than for an individual UE within the group.

One principle of group transmission is that the network should see the group as a single UE. In this way, the network can use conventional signaling for a single UE towards the group. It is necessary that all UEs hold the same data for transmission, for example in a transmission buffer reserved for group data and also that the transmission is synchronized. In 3GPP LTE data transmissions from UEs to the network rely on uplink (UL) scheduling mechanisms such as the transmission by a UE of a Scheduling Request (SR) for UL resources, Buffer Status Report (BSR) and the receipt of an uplink resource grant (UL Grant) from the network node. For group transmissions this signaling must be carried out in a coordinated and reliable manner to ensure synchronization between the different members of the group.

However, forwarding the downlink control data requires additional processing and transmission time and may require delayed uplink data transmission.

SUMMARY

An object of the present disclosure is to address problems associated with the above described group UL scheduling by providing methods, devices and network nodes that enable improved performance for group transmissions.

The above and further objects are obtained according to an aspect of the present invention in a method in a first device for scheduling a group transmission from a group of devices to a network node of a wireless telecommunications network, where the group of devices includes the first device and at least one other device. The method includes determining at least one condition relating to the group of devices and/or the group transmission, selecting one of a relayed grant mode or a direct grant mode for the group transmission in dependence of the determined condition, receiving a grant for uplink transmission from the network node; relaying the grant to the at least one other device if relayed grant mode is selected; and responding to the grant by transmitting data to the network node as part of a group transmission.

The grant mode, i.e. relayed grant mode in which the grant received from the network node is relayed to the other devices of the group, or direct grant mode, in which each device directly receives the grant from the network node, can thus be selected dynamically in dependence of the prevailing conditions of the group of devices or of the type of data to be transmitted in the group transmission ensuring the optimal transmission characteristics for each group transmission, if necessary. The first device is normally the coordinator of the group.

In an embodiment, the at least one condition to be determined includes: the quality of the uplink and/or downlink between the group of devices and the network node relative to a threshold; the size of the group of devices relative to a threshold; the type of traffic to be transmitted as part of a group transmission, the rate of uplink retransmission relative to a threshold, receipt of a notification from one of the other devices of said group of devices, and receipt of a notification from said network node indicating the use of a direct grant mode or relayed grant mode.

The link quality provides an indication of the ability of each member of the group to respond to a direct grant signal from the network node. Hence a low link quality would be an indication that relayed grant mode should be selected. In other words the link quality is monitored and when this falls below a threshold, relayed grant mode is selected. In addition or alternatively, if the group exceeds a certain number of members the risk that one or more group devices will not be able to respond to a direct UL Grant is increased. The determination that the group size exceeds a threshold is a further indicator to switch to relayed grant mode. The condition of the group transmission, i.e. the type of traffic to be transmitted, can also influence the selection of grant mode. Short transmissions, for example those requiring a single sub-frame or Transmission Time Interval (TTI) may be transmitted using direct grant mode even if one or more group members fails to receive the grant signal and hence schedule the transmission because synchronization of the group can be retained by clearing transmission buffers. Other traffic may have low latency requirements and not tolerate the risk of an additional delay with relayed grant mode. It is further possible for one or more of the group devices to send a notification to the first device requesting direct or relayed transmission. Similarly a further condition is the receipt of a notification of the grant mode from the network node. This will occur when the network node makes a selection based on certain conditions.

Finally, the rate of uplink retransmission is an indicator that one or more of the devices in the group is out of synch with the group. This value may be an average value calculated over a certain time period. When synchronized, all devices of a group hold identical data for group transmission, specifically in group buffers, or HARQ buffers. If one of the devices is out of synch with the group the data transmitted from this device generates interference in the group transmission. The result will often be a retransmission request (e.g. NACK) from the network node. Uplink retransmissions are generally set in an allowable range, for example from 1% up to 10% of packets are retransmitted. When the rate of retransmissions exceeds a certain threshold, for example 10% of packets over a certain time period, this can thus serve as an indicator that the group is no longer synchronized and that relayed grant mode should be selected.

If the condition leads to a selection by the first device, the method includes communicating the selected grant mode to the network node and/or to at least one device of the group of devices. Whilst it is feasible for all members of the group to automatically implement either the direct or relayed grant mode in dependence of certain conditions, for example the traffic type, in one embodiment, the first device communicates the selected grant mode to the other devices of said group of devices. This allows the coordinating first device to retain control over the dynamic selection of the grant mode.

In addition or alternatively, the at least one condition may include determining a non-detection by at least one of the other devices of the group of devices of a grant signal transmitted directly by the network node. The non-receipt of this grant signal indicates that DL coverage is insufficient and synchronized transmission is unlikely to occur. It is hence an indication that relayed grant mode is advocated.

In a further aspect, the at least one condition includes: calculating a checksum of data to be transmitted as part of a group transmission held at by the first device, determining whether parity exists between said checksum and a further checksum received from at least one of the other devices of the group of devices and calculated on data to be transmitted as part of said group transmission held by said at least one other device. All members of the group will buffer data for the group transmission, and this data should be identical for each group member. Comparing checksums calculated by group member devices on their own buffered data with a checksum calculated by the first, coordinating device provides a simple and reliable mechanism for ensuring that all group transmission will be synchronized. If parity does not exist between the checksum calculated by the first coordinating device and a received checksum, this is an indication that relayed grant mode should be selected.

In accordance with an aspect, the step of selecting a relayed grant mode includes selecting a data transmission delay associated with the relayed grant mode and communicating the selected delay to the network node and to the other devices of said group of devices. The processing and transmission time required to relay the grant signal to all members of the group may vary depending on the number of group members and their spatial distribution. The retransmission scheme implemented for the grant signal relay may also affect this time. It is thus advantageous for the first device to select a delay for the relayed grant mode.

In an alternative aspect, the delay is selected or set by the network node and communicated to the first node.

In accordance with an embodiment, the exchange of information with the other devices of the group of devices is performed using a device-to-device or sidelink communication protocol. This will generally provide a more reliable and robust link due to the close proximity of the group members.

In accordance with a further aspect, the above and further objects are also achieved in a device for performing a group transmission from a group of devices to a network node of a wireless telecommunications network, where the group of devices including the device and at least a first device, the first device acting as a group coordinator. The method includes: receiving a notification from the first device of a grant mode to be used for the group transmission, the grant mode being either a direct grant mode or a relayed grant mode, receiving a grant for uplink transmission according to said notified grant mode, and responding to the grant signal by transmitting data to the network node as part of a group transmission.

When the notified grant mode is relayed grant mode, the device will receive the grant signal via the first device, which relays the grant signal from the network node. The device may also be notified of a delay for use in relayed grant mode from the first device, in which case the data transmitted as part of said group transmission will be scheduled with the notified delay.

In accordance with an embodiment, the device may, prior to receiving the notification of a grant mode, detect a grant signal transmitted directly from said network node and notify the first device of this detection. Failure to detect the grant signal provides an indication for the first device that relayed grant mode is required.

Additionally or alternatively the device may, prior to receiving the notification of a grant mode, calculate a checksum on data queued in the device for transmission as part of a group transmission, and transmit the checksum to the first device. This information also allows the first device to assess the need for a change in grant mode.

In accordance with a further aspect, the above and further objects are achieved in a method in a network node of a wireless communications network. The method includes: determining at least one condition relating to the group of devices and/or the group transmission, selecting one of a relayed grant mode or a direct grant mode for the group transmission on the basis of the at least one determined condition, transmitting a grant signal for said transmission, and receiving the data transmission.

In accordance with an embodiment, the condition for making the selection of the grant mode may include one or more of: the quality of the uplink and/or downlink between at least one of said devices and the network node relative to a threshold; the size of the group of devices relative to a threshold; the type of traffic to be transmitted as part of a group transmission, the rate of uplink retransmission relative to a threshold, and receipt of a notification from at least one device of said group of devices indicating the use of a direct grant mode or relayed grant mode. Accordingly, the network node may receive a notification from one of the group of devices, generally the coordinator, of the grant mode that is to be used. In this case, the network node may not determine other conditions. However, the network node may alternatively determine whether a change in grant mode is required by assessing the prevailing conditions. In this latter case, the method includes the step of communicating the selected grant mode to at least one of the devices.

In an embodiment, the network node will further receive a notification of a delay used for relayed grant mode. The network node is thus able to correctly schedule receipt of the uplink transmission. Alternatively, the network node may select a delay to be used with a relayed grant mode and notify the device of the selected delay to be applied to the uplink transmission.

According to further aspects of the present invention, the above objects are achieved in devices and a network node as well as a computer program and a carrier of the computer program as set forth in the accompanying claims.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 6 is a flow diagram illustrating a method performed by a wireless device acting as coordinator of a group transmission group of devices according to an aspect of the present invention;

FIG. 7 is a flow diagram illustrating a method performed by a wireless devices forming part of a group transmission group of devices according to an aspect of the present invention;

FIG. 8 is a flow diagram illustrating a method performed by a network node according to a further embodiment;

DETAILED DESCRIPTION

Figure 1A:
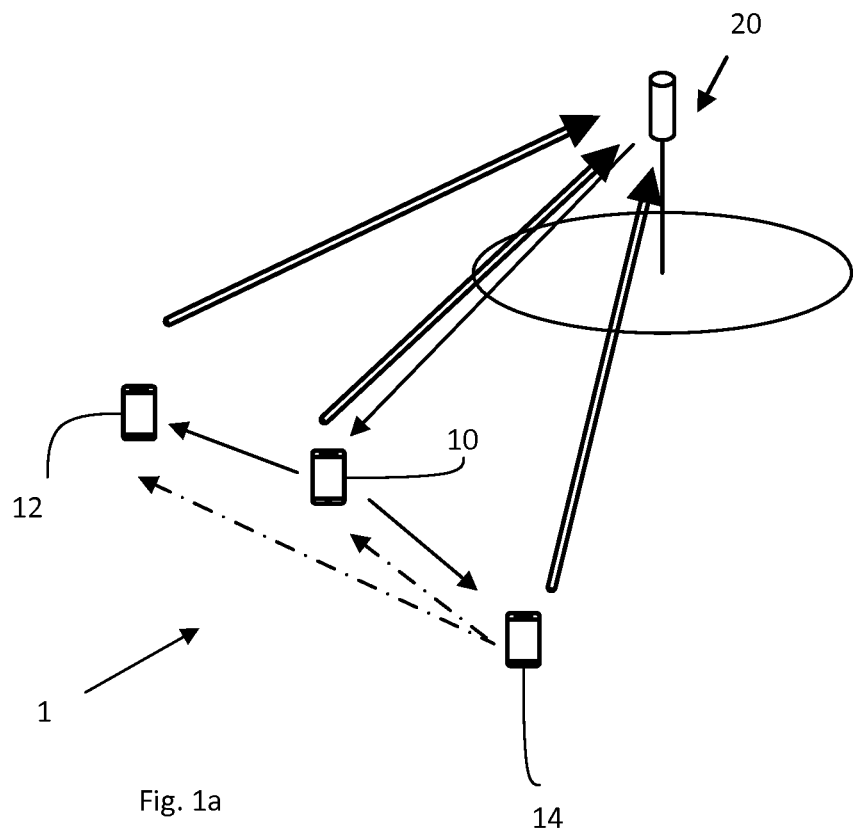
FIG. 1a schematically illustrates part of a mobile telecommunications network configured for group transmissions.

The Group UL Grant transmitted from the network node to the UEs of the group can be handled in two different ways. More specifically, the Group UL Grant can be transmitted directly to all UEs of the group, e.g. using a physical control channel associated with a group identification. This first approach is referred to hereinafter as a direct grant mode. In 3GPP LTE terminology, the Group UL Grant is transmitted on the Physical Downlink Control Channel (PDCCH) which is associated with a group Cell Radio Network Temporary Identity (C-RNTI), i.e. the identity associated with the group. When the same mechanism is used for group transmission, all UEs in the group receive the Group UL Grant directly via the group PDCCH. The latency is kept low and is the same as for conventional single UE transmission. However, group transmission is primarily advocated when there is bad network coverage. Hence there is a risk when the Group UL Grant is transmitted directly that it will not be received by all UEs. As a consequence, some UEs of the group may not participate in the group transmission scheduled by the Group UL Grant, leading to un-synchronized transmission buffers and a risk of interference in future group transmissions.

In the second approach, the grant is received by one UE only, namely a coordinator UE, the coordinator of the group, and relayed by that UE to the other members of the group. This second approach is hereinafter referred to as a relayed grant mode. In an example applied to 3GPP LTE, this means that the coordinator UE receives a Group UL Grant either via the PDCCH associated with its own C-RNTI or via the PDCCH associated with the group C-RNTI and forwards this grant to the UEs in the group using D2D/sidelink transmission. The D2D links between group UEs often provide a better connection than the cellular network because the UEs of the group will be in close proximity with one another. However, relaying the Group UL Grant requires additional processing and transmission time and may require delayed data transmission. As a consequence, relayed grant mode increases the reliability of reception of the grant by the different UEs in the group but at the cost of a potential delay.

Both grant modes have advantages and drawbacks when used in a system that exploits group transmission. There is thus a need to ensure that the most appropriate grant mode is utilized when implementing group transmission to minimize loss of synchronization or unacceptable latency requirements.

In embodiments set out below there is described a first device for coordinating a group transmission from a group of devices, including the first device and at least one other device, to a network node of a wireless telecommunications network. The first device comprises a processor and a memory, the memory containing instructions executable by the processor to control the operation of the device. The first device is configured to determine at least one condition relating to the group of devices and/or the group transmission, select one of a relayed grant mode or a direct grant mode for the group transmission on the basis of the at least one determined condition, receive a grant for uplink transmission from the network node, relay the grant to the at least one other device of the group of devices if relayed grant mode is selected, and respond to a grant signal received from the network node by transmitting data to the network node as part of a group transmission.

In further embodiments set out below there is described a device for performing a group transmission as part of a group of devices, including the device and at least a first device, to a network node of a wireless telecommunications network. The device comprises a processor and a memory, the memory containing instructions executable by the processor to control the operation of the device. The device is further configured to: receive a notification from the first device of a grant mode to be used for the group transmission, the grant mode being either a direct grant mode or a relayed grant mode, receive a grant for uplink transmission according to the notified grant mode, and respond to the grant by transmitting data to the network node as part of a group transmission.

In some embodiments below there is further described a network node of a wireless communications network adapted to receive a group transmission from a group of devices and comprising a processor and a memory, the memory containing instructions executable by the processor to control the operation of the node. The node is configured to: determine at least one condition relating to said group of devices and/or the group transmission, select one of a relayed grant mode or a direct grant mode for the group transmission on the basis of the at least one determined condition, transmit a grant for the group transmission, and receive the data transmission in response to the grant.

In further embodiments given below a device for coordinating a group transmission from a group of devices, including the device and at least one other device, to a network node of a wireless telecommunications network is described. The device comprises: a determination module for determining at least one condition relating to the group of devices and/or the group transmission, a selection module for selecting one of a relayed grant mode or a direct grant mode in dependence of the determined condition, a receiving module for receiving a grant for uplink transmission from the network node, a relaying module for relaying the grant to the at least one other device if relayed grant mode is selected and a responding module for responding to the grant signal by transmitting data to the network node as part of a group transmission.

In still further embodiments set out below a device for performing a group transmission from a group of devices including the device and at least a first device, to a network node of a wireless telecommunications network is described. The device comprises: a first receiving module configured to receive a notification from the first device of a grant mode to be used for the group transmission, the grant mode being either a direct grant mode or a relayed grant mode, a second receiving module for receiving a grant for uplink transmission according to said notified grant mode, and a responding module for responding to the grant by transmitting data to the network node as part of a group transmission.

In other embodiments set out below a network node of a wireless communications network, arranged to communicate with user equipment of the wireless communication network is described. The network node comprises: a determination module for determining at least one condition relating to the group of devices and/or the group transmission, a selection module for selecting one of a relayed grant mode or a direct grant mode for the group transmission on the basis of the at least one determined condition, a transmitting module for transmitting a grant for the uplink group transmission, a receiving module for receiving the data transmission.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

Figure 1B:
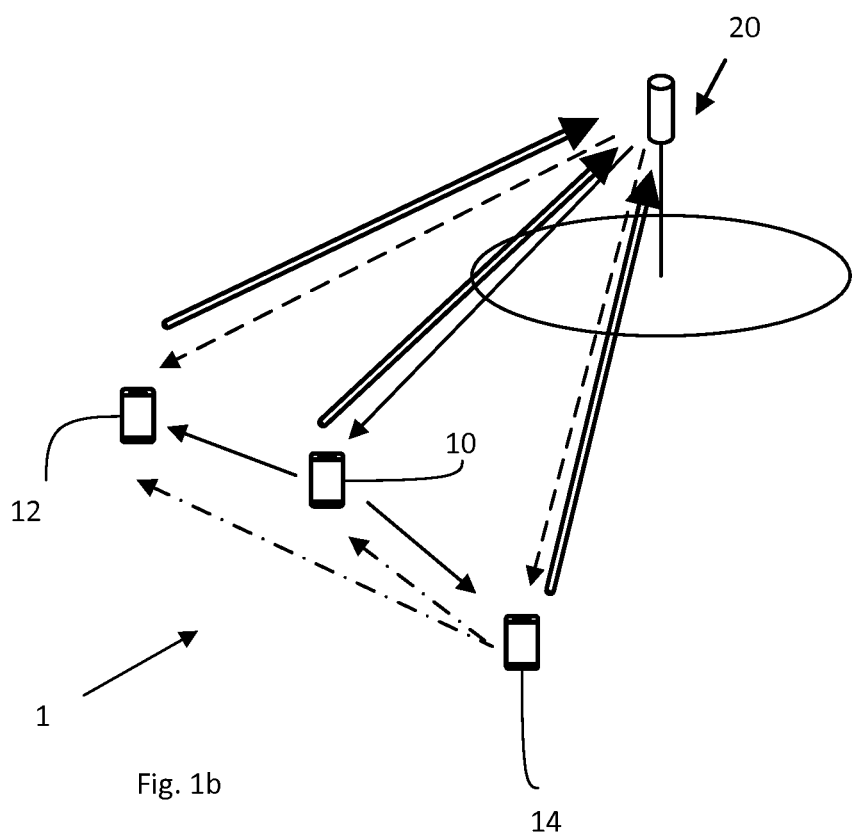
FIG. 1b illustrates part of a mobile telecommunications network configured for group transmissions according to embodiments disclosed herein, FIG. 2 schematically illustrates a device in accordance with aspects of the invention.

FIG. 1*b* shows part of a mobile telecommunications network including a Network Node or base station 20 and wireless or user equipment (UE) devices 10, 12, 14 for which the embodiments disclosed herein apply. It will be appreciated that the mobile telecommunications network may have more network nodes and that many more UE devices can communicate with the illustrated Network Node or base station or other network nodes/base stations as well as other UE devices.

The Network Node or base station 20 forms part of a radio access network of the mobile or cellular telecommunications network and may take the form of an eNodeB when the mobile network is a Long Term Evolution (LTE) network. But the invention is not limited to this, and other wireless systems, including WCDMA, WiMax, UMB and GSM, may also benefit from the example embodiments disclosed herein.

The UE devices 10, 12, 14 communicate wirelessly with the Network Node or base station 20 and may include any portable UE devices such as mobile phones or the like or fixed terminals having mobile telecommunication connectivity. The UE device may also be termed wireless device, mobile station, handset, smartphone, etc. The UE devices 10, 12, 14 are configured to operate as a group 1 for uplink transmission in order to increase coverage and user bit rate. The UE devices 10, 12, 14 and Network Node 20 will be described in more detail below with reference to FIGS. 4 and 5.

Figure 2:
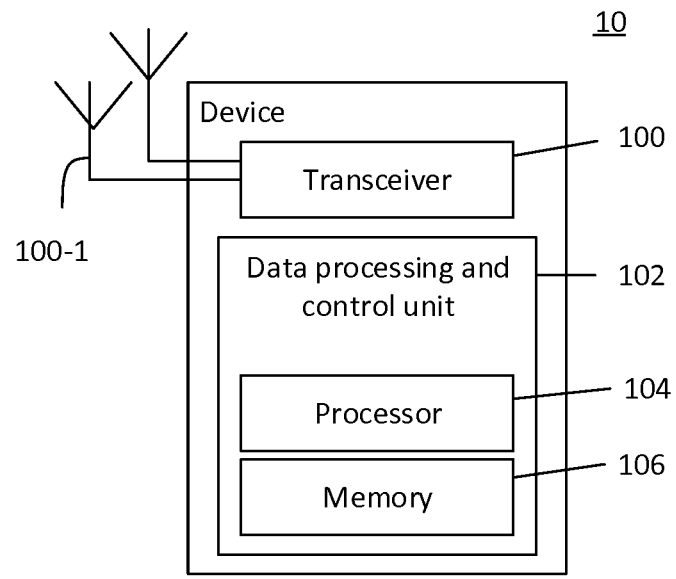
Figure 3:
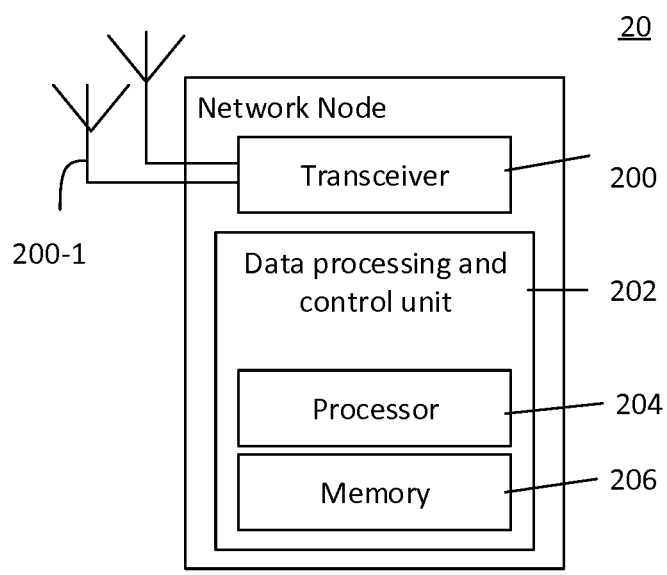
FIG. 3 schematically illustrates a network node in accordance with aspects of the invention.

FIGS. 2 and 3 illustrates the UEs 10, 12, 14 and the Network Node or base station 20 in more detail. With reference to FIG. 2 the user equipment devices 10, 12 and 14 are identical in all essential respects for the purposes of the present disclosure and thus only one, namely, the UE device 10 will be described here.

UE device 10 comprises a transceiver module 100 and a data processing and control module 102. The transceiver module 100 comprises the components necessary for communication with Network Node or base station 20 and other Network Nodes or base stations of the mobile telecommunications network over a wireless interface and using a suitable communications protocol. Among these components are one or more antennas, 100-1, via which the UE device 10 may transmit signals towards the Network Node or base station 20 or other UE devices 12, 14 and receive signals therefrom. The transceiver module may also comprise components necessary for direct communication with at least one other device, such as the illustrated devices 12, 14, using a suitable communications protocol. One such protocol is the Device-to-Device (D2D) short-range communications protocol specified in LTE, also known as Sidelink communication. It will be understood that the transceiver module 30 may comprise suitable transceiving, receiving, and/or transmitting units or circuitry and comprise RF circuitry and baseband processing circuitry.

The data processing and control module 102 includes a processor 104 and a memory 106. The memory 106 stores instructions, in the form of a computer program, for causing the processor 104 to carry out the steps described herein. The computer program may be installed in the memory 106 prior to the device being put into operation or alternatively be downloaded subsequently as a separate application. The memory 106 may also be configured to store any form of beamforming information, reference signals, and/or feedback data or information and may be any suitable type of computer readable memory and may be of volatile and/or non-volatile type. The processor 104 may be configured to perform measurements and set configurations provided by the Network Node or base station 20. The processor 104 may comprise any suitable type of computation unit, e.g. a microprocessor, digital signal processor (DSP), field programmable gate array (FPGA), or application specific integrated circuit (ASIC) or any other form of circuitry. It should be appreciated that the processor 34 need not be provided as a single unit but may be provided as any number of units or circuitry elements.

Referring to FIG. 3, Network Node or base station 20 includes a transceiver module 200 and a data processing and control unit module 202. The transceiver module 200 comprises the components necessary for communication with the core network of the mobile telecommunications network as well as for communicating with multiple devices over a wireless interface via one or more antennas 200-1. To that end it may include any number of transceiving, receiving, and/or transmitting units or circuitry. It should further be appreciated that the transceiver module 200 may be in the form of any input/output communications port known in the art and may comprise RF circuitry and baseband processing circuitry.

The data processing and control module 202 includes a processor 204 and a memory 206. The memory 206 stores instructions, in the form of a computer program, for causing the processor 204 to carry out the steps described herein. The computer program may be installed in the memory 206 prior to the Network Node or base station being put into operation or alternatively be downloaded subsequently as a separate application. The memory 206 may be configured to store received or transmitted data and/or executable program instructions as well as any form of beamforming information, reference signals, and/or feedback data or information. The memory 206 may be any suitable type of computer readable memory and may be of volatile and/or non-volatile type. The processor 204 may be any suitable type of computation unit, e.g. a microprocessor, digital signal processor (DSP), field programmable gate array (FPGA), or application specific integrated circuit (ASIC) or any other form of circuitry. It should be appreciated that the processor 204 need not be provided as a single unit but may be provided as any number of units.

Turning again to FIG. 1b, the group of UE devices 1 may operate as a single antenna array to transmit the same data in a synchronised manner or alternatively by the spatial multiplexing of transmissions between the different devices 10, 12, 14 of the group. In both cases, one UE device acts as a group coordinator or master device. In the illustrated example this is device 10. The coordinating UE device 10 may receive all downlink signalling from the Network Node or base station 20 for the group and relay this as necessary to the other members of the group as illustrated by the single-line arrows. Alternatively, some of the downlink signalling may be received directly by each member of the group 1. The coordinating user equipment device 10 also assures the necessary control signalling for the group, such as the Channel Quality Indicator (CQI), Hybrid Automatic Repeat Request (HARQ) and ACK/NACK mechanisms and the like. All the UE devices operating in the group use the same user identification or group identifier. The network, and specifically Network Node or base station 20 thus views the group as a single UE device.

When one UE device wishes to send data to the Network Node or base station 20, but due to bad network coverage, or possibly in a bid to increase user bit rate, desires to send data as part of a group of UE devices, it sends this data to the other UE devices in the group 1. In the illustrated arrangement UE device 14 sends data to UE devices 10 and 12 as illustrated by dash-dotted arrows in FIG. 1b, and all UE devices 10, 12, 14 subsequently transmit the same data jointly as illustrated by the double-line arrows. This group uplink transmission is perceived by the Network Node or base station 20 as a transmission from a single UE device.

Communication between UE devices 10, 12, 14 may be carried out using any wireless communications technology that is outside the mobile telecommunications network. In the case of an LTE network, the devices might communicate using the LTE Device-to-Device (D2D) communication service that enables communication between user equipment devices when these are in proximity to one another. Alternatively, any communication system, e.g. short-range, outside of the mobile telecommunications network may be utilised via which the UE devices 10, 12, 14 may communicate directly or indirectly with other members of the group.

Figure 4:
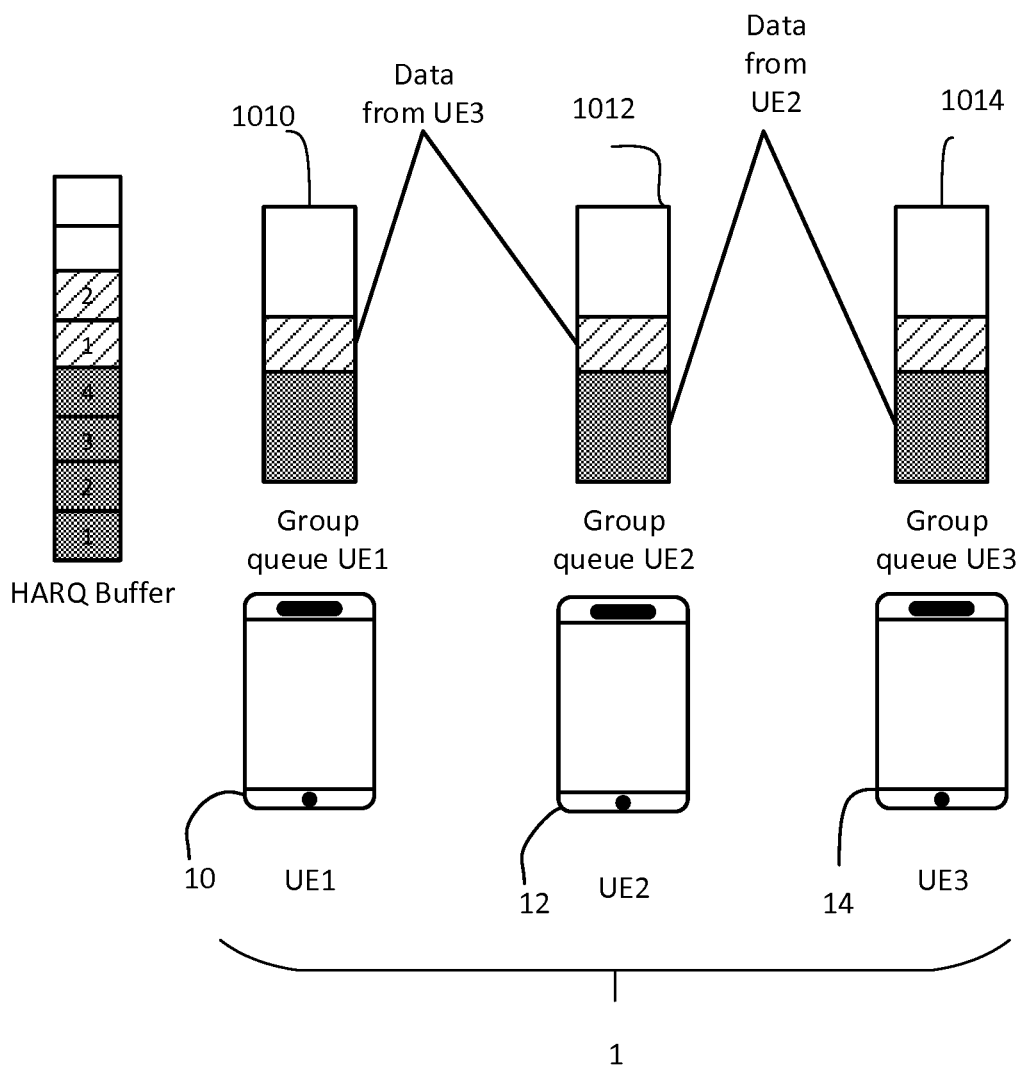
FIG. 4 illustrates group buffers of UEs forming part of group configured for joint transmission.

FIG. 4 illustrated how data is buffered for group transmission by each member UE of the group 1. For the purposes of illustration only, three UEs are shown, UE1 10, UE2, 12 and UE3 14. Each UE 10, 12, 14, of a group 1 is provided with a storage area serving as a group buffer, namely, as a buffer for data to be transmitted as part of a group transmission. The buffer 1010, 1012, 1014 is in each case depicted above the UE in question. As can be seen in FIG. 4, each buffer 1010, 1012, 1014, holds identical data. A first set of data shown in grey originates from UE2 12. A second set of data shown shaded in FIG. 4 originates from UE3 14. These group buffers are HARQ buffers allowing retransmission of data in the event of a received non-acknowledgement (NACK) from the Network Node or base station 20. A HARQ buffer is illustrated to the left of the figure and shows the data from UE2 12 and UE 14 divided into four and 2 sub-frames or TTIs, respectively. Since all UEs in the group transmission group transmit at the same time, it is essential that the group buffers of all group member UEs are identical.

The uplink transmission of the same data jointly by several UE devices requires the joint scheduling of the multiple devices forming part of the group 1. In conventional LTE systems a UE with a data packet to send transmits a MAC layer Scheduling Request (SR) for uplink resources on the to the eNodeB via the Physical Uplink Control Channel (PUCCH) identified by a Cell Radio Network Temporary Identity (C-RNTI) associated with the requesting UE in question. In response the eNodeB sends an Uplink Grant granting uplink resources for transmission of the data packet on the Physical Downlink Control Channel (PDCCH) that is likewise associated with the UE's C-RNTI. The UE then transmits the data packet in a specific predefined sub-frame or Transmission Time Interval (TTI) after the Group UL Grant transmission and/or reception. The time period between the transmitting a sub-frame/TTI containing Group UL Grant and the specified TTI for the scheduled data transmitting is essentially a default delay imposed by the eNodeB.

Figure 5A:
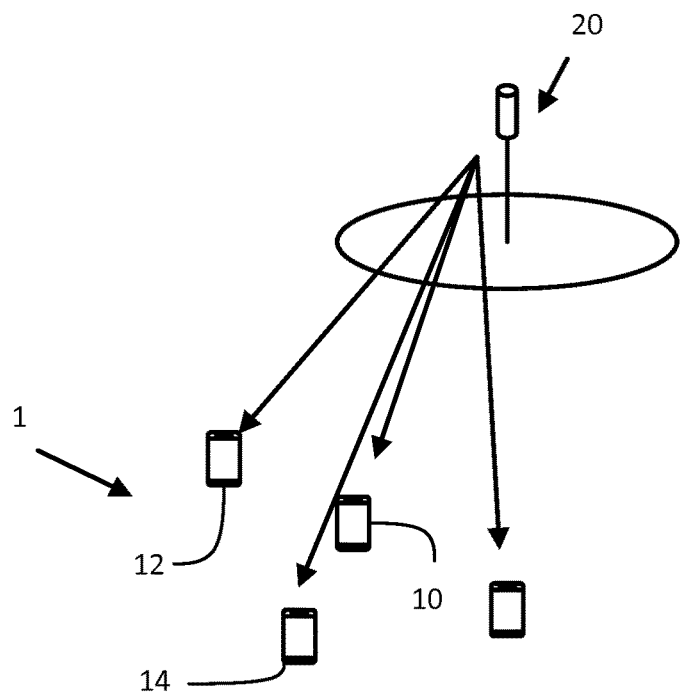
FIGS. 5a and 5b each show part of a mobile telecommunications network configured for direct grant mode and relayed grant mode, respectively.

This same principle can be used for group transmissions as illustrated in FIG. 5a, and this manner of scheduling group transmission is referred to as direct grant mode. In some aspects, the direct grant mode may be considered as each UE device of the group receiving the Group UL Grant directly from the network node. Thus, each UE device of the group are separately or independently granted resources for group uplink data transmission. The uplink data transmission is carried out, as described above, synchronized with the other UE devices as part of the group transmission.

More specifically, the group 1 is assigned a PUCCH and PDCCH associated with a group identification or ID, i.e. a group C-RNTI. When the group 1 has data to transmit, i.e. data in the group buffers 1010, 1012, 1014 of each group member, the coordinating UE 10 sends a request for uplink resources (Scheduling Request) via the PUCCH associated with the group ID. In response, the Network Node or base station 20 sends an Uplink Grant (Group UL Grant) using the PDCCH associated with the group ID. All UEs 10, 12, 14, in the group that receive the Group UL Grant schedule the transmission of data in the same sub-frame or time interval (TTI) with the default delay imposed by the Network Node or base station.

However, one of the benefits of group transmission arises from the fact that UEs can transmit uplink data even when coverage is bad or non-existent provided that they are in proximity with other UE devices of the group. As a result, when operating in this direct grant mode there is a risk that one or more of the group members UE 10, 12, 14 will not receive the Group UL Grant directly from the Network Node or base station 20. Those UEs 10, 12, 14 that fail to receive the Group UL Grant directly will not transmit in the designated sub-frame or time interval. As a result the group buffers 1010, 1012, 1014 will no longer be identical and synchronized transmission is not possible. Moreover, if those out of synch UEs respond to future Group UL Grants, those transmissions will not only reduce the SINR gains achievable with group transmission, but will actively degrade the performance by generating interference.

Figure 5B:
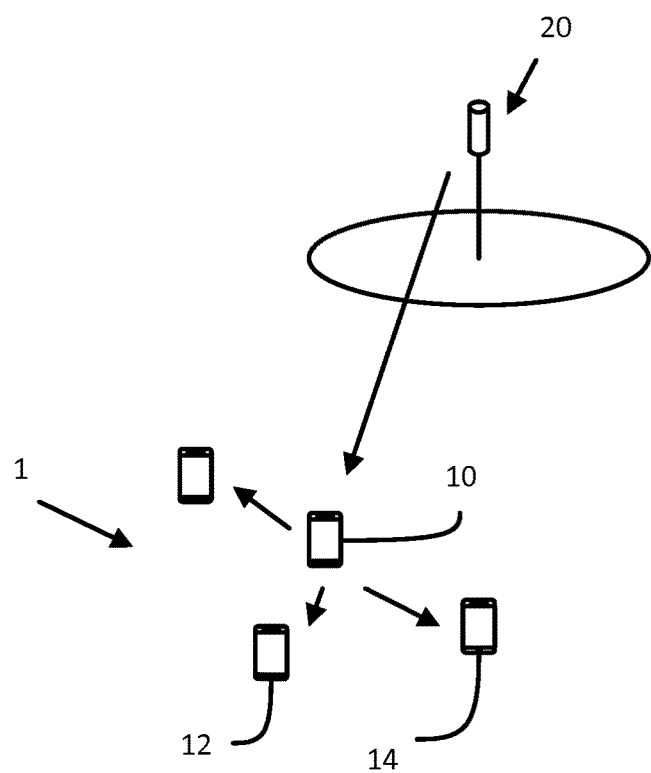

An alternative method of scheduling group transmissions is by means of a relayed grant mode. This is illustrated in FIG. 5b. In this mode, the Group UL Grant is received by one UE 10, the coordinating UE, and this UE 10 then relays the Group UL Grant to the other members of the group using D2D or sidelink communication. The Group UL Grant may be transmitted by the Network Node or base station 20 on the PDCCH associated with the coordinating UE's 10 ID. Alternatively, the Group UL Grant may be transmitted on the PDCCH associated with the group ID. In this latter process, all UEs 10, 12, 14 have the possibility to detect the Group UL Grant from the Network Node or base station 20 but will only respond to a Group UL Grant relayed via the coordinator UE 10. Relaying the Group UL Grant provides a greater reliability of the Group UL Grant being received by all group members. Reliability can be still further enhanced by transmitting the Group UL Grant with a low coding rate or by using retransmission, possibly autonomous retransmission. In the relayed grant mode, the UEs in the group, other than the coordinating UE, use the Group UL Grant as relayed via the coordinator UE 10 for group UL transmission. For such UEs, any Group UL grant received from the network node is ignored. The coordinating UE receives and uses the Group UL Grant received from the network node, in both relayed grant mode and direct grant mode.

The direct grant mode provides shorter latency and is thus a valuable mode of operation for transmitting data with strict latency requirements, or when all data can be transmitted in a single sub-frame or TTI. In the latter case, there is less risk of interference when one or more UEs of the group 1 fail to receive the Group UL Grant directly, as there is time to synchronize the transmission buffers by emptying these after the transmission. The relayed grant mode, on the other hand, is beneficial where larger amounts of data are to be transmitted, specifically more data than can be transmitted in a single TTI, or when the coverage is bad and particularly when some UEs of the group are out of network coverage, but group transmission using all group members is required. Both grant transmission modes are thus useful and needed to fully exploit the benefits of group transmission. Aspects of the disclosure provide for a selection between the relayed grant mode and direct grant mode, e.g. based on network conditions, in order to effectively schedule the plurality of UEs in the group.

In accordance with an embodiment, the grant mode for group data transmission is selected by a coordinator UE, or alternatively by the Network Node or base station 20, in dependence on at least one condition of the group of UEs or the group transmission, i.e. the transmission data. In this way the scheduling of group transmissions can be adapted dynamically to the prevailing circumstances affecting the UEs of the group and/or the type of data to be transmitted and so provide the in order to best profit from the benefits of group transmission.

Moreover, when relayed grant mode is selected, it can be advantageous to impose an additional delay for the data transmission. More specifically, the additional processing and transmission time required to relay the Group UL Grant to the other group members via D2D links means that some members of the group may not be ready to transmit the group data in the specified sub-frame or TTI for the scheduled transmission. Thus, while in conventional UL transmission from a single UE and the group direct grant mode described above a Group UL Grant sent in TTI x is followed by an uplink data transmission in TTI x+t where t is a default delay to allow time for the Group UL Grant to be received and processed by a UE, this default delay may not suffice in relayed grant mode. Hence an additional delay d can be imposed, such that the group transmission is scheduled for TTI x+d, where d>t. This delay d may be fixed or alternatively selected, either by the coordinating UE or the Network Node or base station 20. When the coordinating UE selects or sets the delay, it will inform the Network Node or base station 20 and the other members of the group 1 of this additional delay. Alternatively, the additional delay may be configured in advance for the relayed grant mode. The additional delay may also be selected as a function of the condition of the group or the type of traffic to be sent in a group transmission. In particular, the delay may depend on D2D-specific parameters, such as processing delays and retransmission scheme applied. These parameters may, in turn, depend on the group size and the spatial distribution of the UEs in the group 1.

Turning to FIGS. 6 to 8 methods will now be described that allow a direct or relayed grant mode to be selected in accordance with embodiments of the invention.

FIG. 6 illustrates a method performed by a UE acting as a coordinator of a group 1. More specifically, the method starts at step 300 with the coordinator UE selecting either a relayed grant mode (as illustrated in FIG. 5b) or direct grant mode (as illustrated in FIG. 5a). This selection is made in dependence of the determined condition of the group 1 or of the group transmission, i.e. the traffic. At step 310, the coordinator UE 10 receives the Group UL Grant from the Network Node or base station 20. Although not shown in this figure, it will be understood that the Group UL Grant will be received after transmission by the coordinating UE of a scheduling request for uplink resources, or SR. If, as determine at step 320, relayed grant mode is selected in step 300, the method moves to step 330 and the coordinator UE relays the received UL grant to each device of the group. If direct grant mode is selected, step 330 is omitted and the method proceeds to step 340. Finally, at step 340 the coordinating UE 10 transmits data as part of a group transmission.

FIG. 7 illustrates the method implemented in a UE group member not acting as coordinator of the group. This method starts at step 400 with the UE receiving a notification of the grant mode to be utilized for a group transmission, i.e. direct grant mode or relayed grant mode from the coordinating UE. At step 410 the UE receives the Group UL Grant transmitted by the Network Node or base station. Depending on whether the grant mode signaled at step 400 is a direct grant mode or relayed grant mode, the Group UL Grant will be received directly from the Network Node or base station 20 over the PDCCH associated with the group ID, or relayed via the coordinator UE using a D2D link, respectively. In fact, in relayed grant mode, the UE may well receive both a direct grant signal from the Network Node or base station 20 and a grant signal relayed via the coordinator UE 10. However, in this mode, the UE group member responds only to the relayed grant signal. At step 420, the UE transmits data as part of a group transmission.

FIG. 8 illustrates the method implemented in Network Node or base station 20. This method starts at step 600 with the Network Node or base station 20 selecting either a direct grant mode or relayed grant mode. This selection is made in dependence of the determined condition of the group 1 or of the group transmission, i.e. the traffic. One of these conditions may be the receipt of a notification from a UE, specifically the coordinator UE 10, of the grant mode to be used for an upcoming transmission. This notification identifies the group using the group ID, e.g. a C-RNTI associated with the group, although the Network Node or base station 20 need not distinguish this ID from a conventional UE ID. At step 610, the Network Node or base station 20 transmits a Group UL Grant to the UE. Although not illustrated, it will be understood that this Group UL Grant will be transmitted in response to a scheduling request for uplink resources, or SR, from the UE. At step 620 the Network Node or base station receives the data transmission from the group 1.

As is apparent from the discussion of FIGS. 6 to 8 above, the selection of the grant mode may be made by the group coordinator UE 10 or the Network Node or base station 20. In either case, the other party is notified of the selected grant mode. In some cases, both the group coordinator UE 10 and the Network Node or base station 20 may assess one or more conditions relating to the group or the traffic for group transmission. The selection by one or other of the elements can then depend on the specific conditions assessed. In some circumstances, it may be appropriate to use the direct grant mode by default and switch to the relayed grant mode only when the conditions render this favourable. If the selected mode is relayed grant mode, it may be appropriate to determine an additional delay for the group transmission. In this case, the group coordinator UE may also notify the Network Node or base station 20 of the delay D that is to be used so that the Network Node or base station can expect the delayed transmission. Alternatively, this delay may be set by the Network Node or base station 20 and communicated to the coordinating UE 10. A fixed relayed grant mode delay may also be pre-configured in all UEs and the Network Node or base station to be applied when the relayed grant mode is used.

In order to ascertain which grant mode to impose for a group transmission, i.e. direct or relayed grant transmission, the coordinating UE 10 and/or the Network Node or base station 20 determines at least one condition relating to the group and to the group transmission, i.e. to the data type or traffic to be transmitted by the group.

One of the conditions that may be determined by the coordinating UE 10 and/or the Network Node or base station 20 is the link quality (uplink and/or downlink) between each group member and the Network Node or base station 20. This information can be signaled to the coordinating UE or Network Node or base station 20 either on request or spontaneously. The link quality indicates the likelihood of the respective UE successfully receiving the Group UL Grant directly from the Network Node or base station 20 and also the chances of a successful uplink data transmission. The number of UEs in the group 1 is also a condition that can influence the choice of grant transmission mode. A large group 1 may increase the risk of one or more UEs of the group failing to receive the direct UL Grant from the Network Node or base station 20. The type of traffic to be transmitted in a group transmission may also determine the choice of grant transmission mode. For example, if the data has particular latency requirements, it may be necessary to select the direct grant mode. Data that must be transmitted in more than one sub-frame or TTI may require the selection of relayed grant mode. The size of the group is known to the coordinator UE 10, but may need to be notified to the Network Node or base station 20.

The rate of retransmission is a further factor that can indicate the need to select relayed grant mode. The rate of packet retransmission is generally set to within an accepted range, for example between around 1% and 10% of packets transmitted. A lower rate would waste power, while too high a rate increases the packet delay unnecessarily. When the group buffers 1010, 1012, 1014 are no longer synchronized, i.e. do not contain the same data, group transmissions will be degraded in quality as the transmission by one or more of the UEs of different data will cause interference. This increases the likelihood of the Network Node or base station requesting retransmission, i.e. by responding with a No Acknowledgement signal (NACK). Similarly, if the DL quality is low for one or more UEs resulting in an Acknowledgement signal (ACK) being perceived as a NACK, this also will increase the rate of retransmission. Both the coordinator UE 10 and the Network Node or base station 20 are able to determine an increase in retransmission above an acceptable threshold level.

A further condition that may be used to determine which grant transmission mode to implement is the status of the group buffers of each group member. As discussed above with reference to FIG. 4 it is essential that the content of the group buffer 1010, 1012, 1014 of each of the group member UEs 10, 12, 14 is identical for successful group transmission. If this is not the case, synchronized transmission is not possible. One way of establishing whether all group buffers are carrying the same data is to generate and compare checksums of all buffer contents. The checksum for the group buffers should be identical. In some examples, each UE 10, 12, 14 in the group 1 should generate a checksum of its own group buffer 1010, 1012, 1014. The coordinating UE 10 can then compare the calculated checksum with a checksum received from each group member, either on request or received spontaneously. If the checksum received from a specific group member does not match the checksum calculated by the coordinator UE, the coordinator UE will select relayed grant mode, but then exclude the specific group member when relaying the grant to prevent interference.

A still further condition is whether the coordinating UE 10 has received an explicit notification from one of the other group member UEs 12, 14. More specifically, each UE in the group 1 can periodically monitor the Group UL Grant is transmitted on the PDCCH associated with the group ID. This may be performed during certain time periods reserved for Group UL Grant transmission. Each member of the group can then notify the coordinator UE of the successful receipt of the Group UL Grant. If a notification is not received from one or more group members, the coordinator UE can decide to switch to relayed grant mode.

Figure 9:
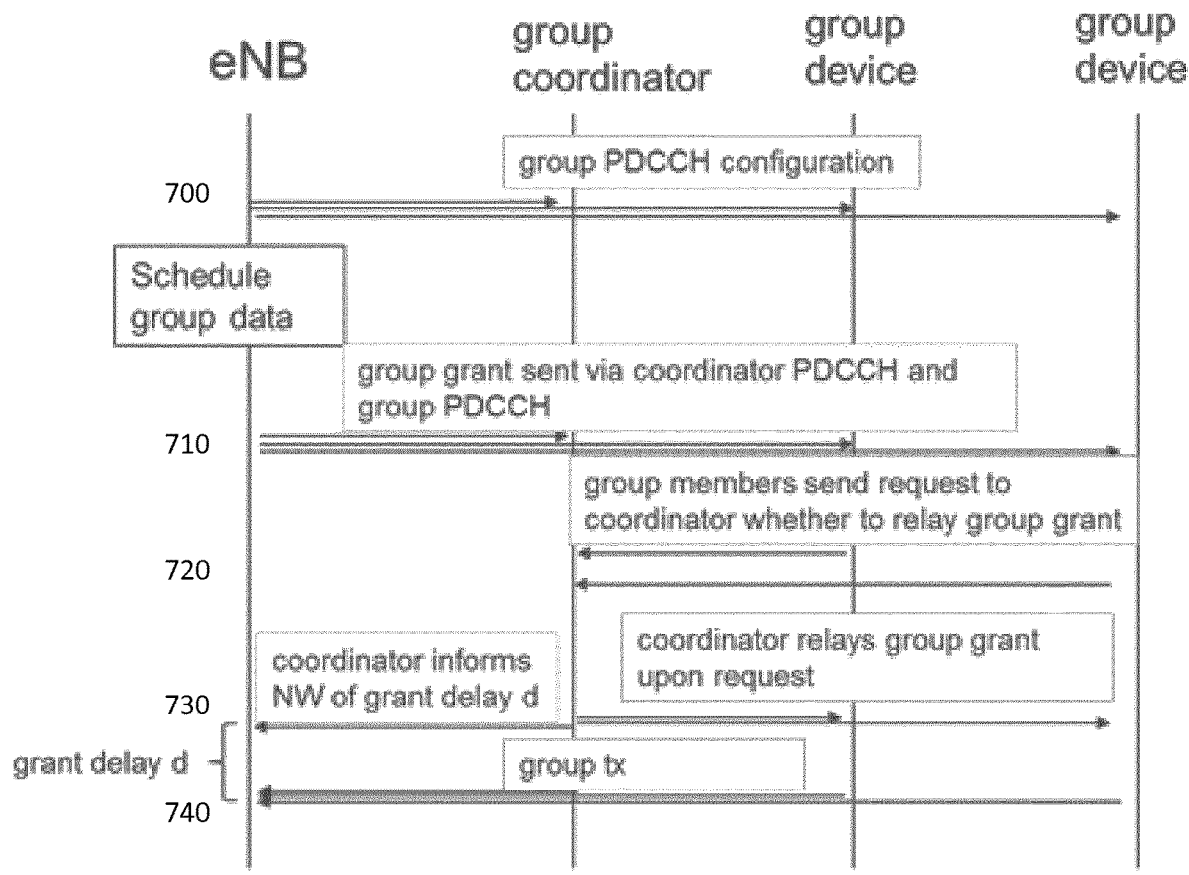
FIG. 9 is a signalling diagram illustrating the exchange of signals between a network node and wireless devices of a group transmission group of devices in accordance with a further embodiment.

FIG. 9 illustrates the signaling between the Network Node or base station, or eNB, group coordinator 10 and the other group devices. The process starts at event 700 when the Network Node or base station configures the group PDCCH. Between this event and the next, group data is scheduled. At event 710 the Network Node or base station sends the Group UL Grant. This is sent via the coordinator UE's PDCCH and also the PDCCH associated with the group ID. At event 720 the group members that have successfully received the Group UL Grant notify the coordinator UE. In some examples this is in the form of a request to the coordinator to relay the grant, if they have not successfully received (decoded) the grant. The coordinator UE then determines whether all group members have notified the successful receipt of the Group UL Grant or not, and selects the relayed grant mode if not all group members have successfully received the grant or if any requests to relay the group grant are received. At event 730 the coordinator UE informs the Network Node or base station of the selected grant mode. The coordinator may also notify the Network Node or base station 20 of a delay, d, to be used with this grant mode. The coordinator further relays the Group UL Grant to the other devices of the group 1 on request. At event 740 each member of the group 1 transmits the data for the group transmission after the specified additional delay d.

Figure 10:
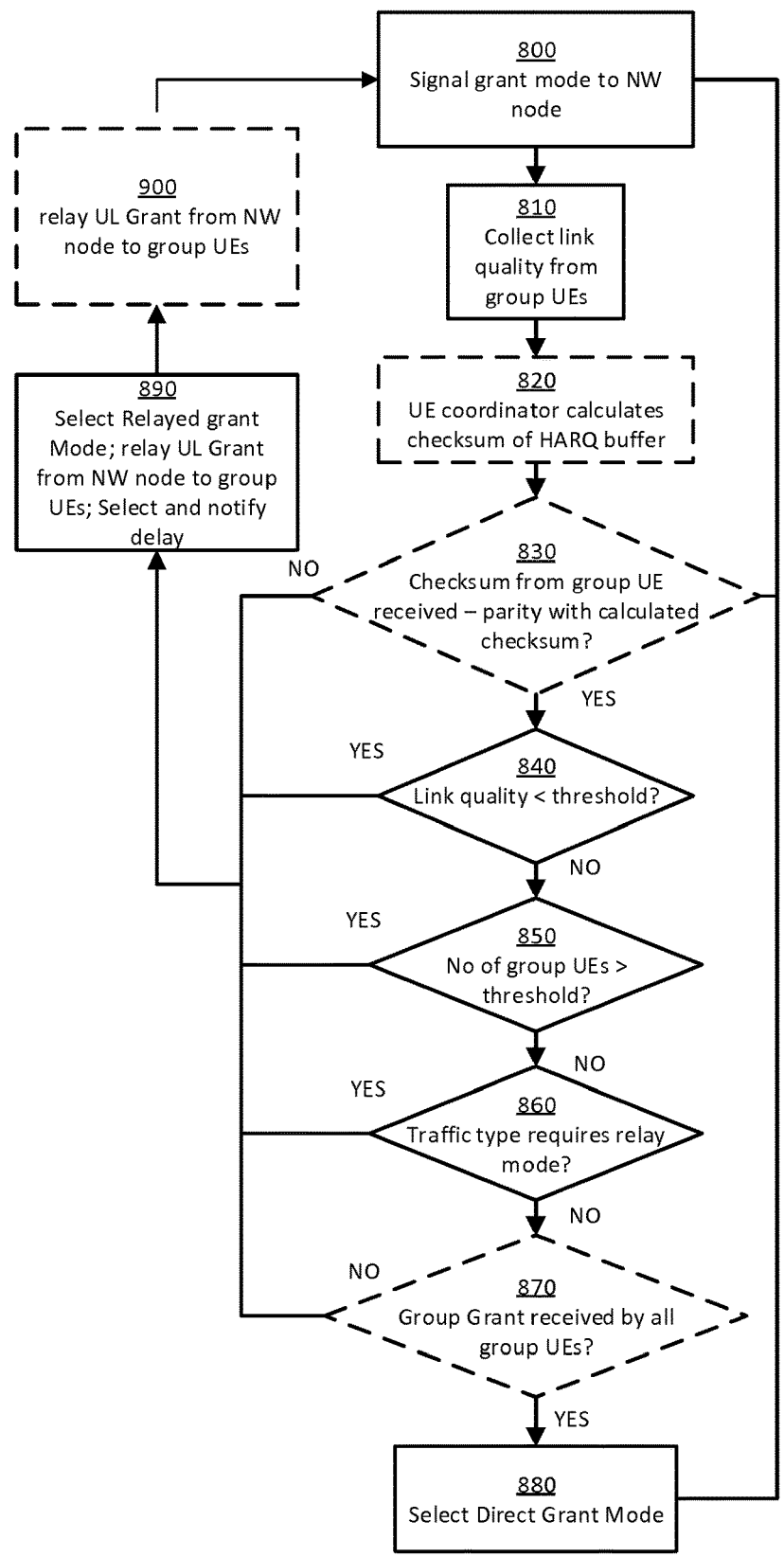
FIG. 10 is a flow diagram illustrating a method performed by a wireless device acting as coordinator of a group transmission group according to a further embodiment.

FIG. 10 illustrates a method implemented in a group coordinator UE in greater detail and specifically describes the determined conditions that affect the grant mode selection.

The method starts at step 800 where the group coordinator UE signals the grant mode for a group transmission to the Network Node or base station 20. At step 810, the coordinator UE receives information on the link quality for each of the other group member UEs. At step 820 the coordinator UE calculates the checksum of the group buffer (HARQ buffer). At step 830 the coordinator UE receives a checksum from at least one other group member and compares this with the calculated checksum. If parity between the two checksums is determined (i.e. the checksums match or are equal), the method moves on to step 840, otherwise it moves directly to step 890. At step 840 the link quality received from the group members is compared with a threshold. If the reported link quality is lower than the threshold for any of the group members. The method moves directly to step 890, otherwise it proceeds to step 850. At step 850 the number of UEs in the group 1 is compared with a threshold. If the threshold is exceeded, the method moves to step 890 directly, otherwise it continues with step 860. At step 860 it is determined whether the traffic type requires direct or relayed grant mode. If it is determined that relayed grant mode is required, the method moves directly to step 890 and otherwise on to step 870, where the coordinator UE determines whether all group members have notified receipt of the Group UL Grant. If all notifications have been received, the method moves to step 880 where direct grant mode is selected, and then to step 800 where this selected mode is notified to the Network Node or base station. If at step 870 it is determined that not all group members have notified the coordinator UE of receipt of the Group UL Grant on the PDCCH associated with the group ID, the method moves to step 890 and the coordinator UE selects relayed grant mode. The coordinator UE also selects or sets a delay to be used for the group transmission with the relayed grant mode. At step 900 the coordinator relays the UL Grant received from the Network Node or base station to the other group members.

It will be understood that the method implemented in a coordinator UE may include determining only one of the conditions defined in steps 820 and 830 or 840 to 870 or any combination of these conditions. Furthermore, the order in which these conditions are determined may be altered depending on the circumstances and configuration of the system components. In addition, whilst in FIG. 10 each of the conditions defined in steps 830 to 870 is used independently to select relayed grant mode, the decision to select relayed grant mode may be the result of a combination of two or more conditions, possibly with different weightings.

The method illustrated in FIG. 10 may also be used in the Network Node or base station 20. In this case, those steps shown with dashed lines are omitted, namely steps 820, 830, 870 and 900. In addition, step 800 is modified to notify the grant mode to the group. This notification will be received and processed by the group coordinator UE 10. Furthermore, the link quality collected at step 810 and the number of group UEs may also be communicated via the group coordinator UE 10.

Turning now to FIGS. 11 to 14 there are illustrated alternative embodiments of the coordinator UE 10, another UE device 12, 14 in the Group 1 and a Network Node or base station 20 in accordance with the present invention.

Figure 11:
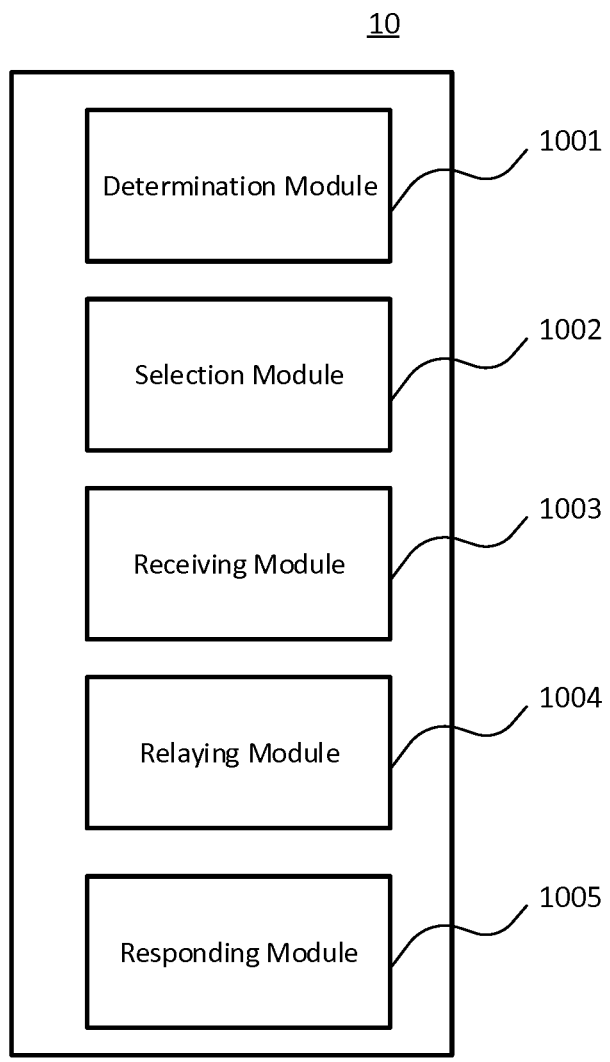
FIG. 11 schematically illustrates a wireless device acting as coordinator in accordance with a further aspect of the present invention.

The coordinator UE depicted in FIG. 11 comprises a determination module 1001 for determining at least one condition relating to the group of devices and/or the group transmission, i.e. the data to be transmitted in the group transmission. The coordinator UE further comprises a selection module 1002 for selecting one of a relayed grant mode or a direct grant mode for the group transmission in dependence of the determined condition. A receiving module 1003 is provided for receiving an UL Grant from a Network Node or base station 20. A Relaying module 1004 is arranged to relay the grant to the other members of the group when relayed grant mode is selected, and a responding module 1005 is provided for responding to the grant signal by transmitting data to the Network Node or base station as part of a group transmission.

Figure 12:
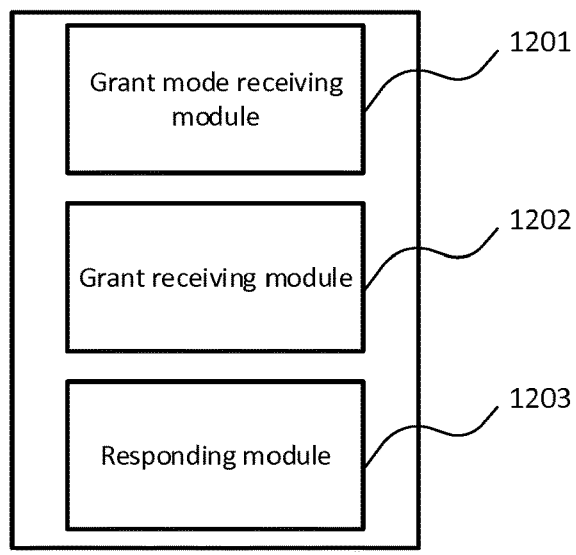
FIG. 12 schematically illustrates a wireless device in accordance with a further aspect of the present invention.

FIG. 12 depicts a UE or wireless device that is another member of the group 1 together with a group coordinator, but does not serve as the group coordinator. This device 12, 14 comprises a receiving module 1201 configured to receive a notification from the coordinator device of a grant mode to be used for the group transmission, the grant mode being either a direct grant mode or a relayed grant mode. The device 12, 14, further comprises a second receiving module 1202 for receiving an UL grant according to the notified grant mode. The device further includes a responding module 1203 for responding to the grant signal by transmitting data to the Network Node or base station as part of a group transmission.

Figure 13:
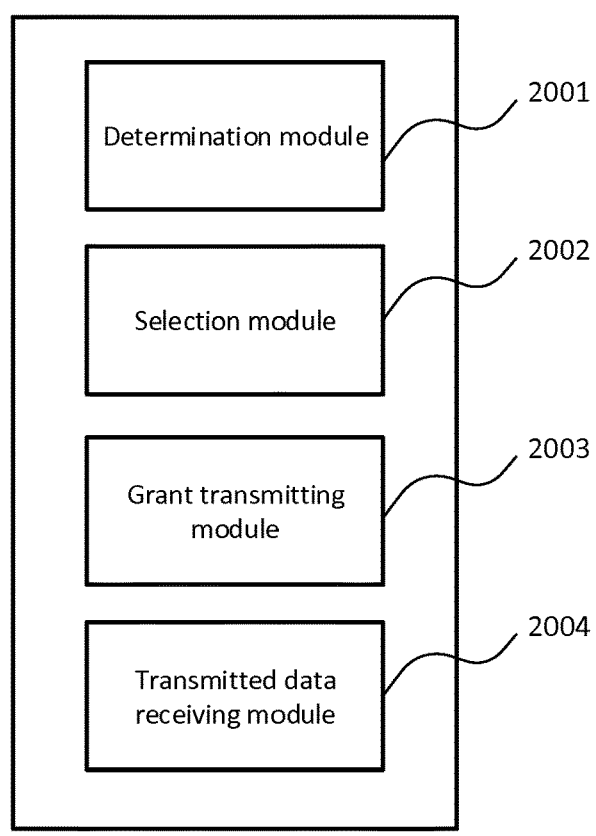
FIG. 13 schematically illustrates a network node in accordance with a further aspect of the present invention.

FIG. 13 schematically illustrates a Network Node or base station 20 that comprises a first determination module 2001 for determining at least one condition relating to the group of devices and/or the group transmission, i.e. the data to be transmitted in the group transmission. The Network Node or base station 20 further comprises a selection module 2002 for selecting one of a relayed grant mode or a direct grant mode for the group transmission in dependence of the determined condition, a transmitting module 2003 for transmitting a grant signal for the uplink data transmission and a receiving module 2004 for receiving the data transmission, possibly with a delay determined by the notification. The UE 10,12,14 and network node 20 described in FIGS. 12 and 13 operate according to any embodiment described.

In some embodiments a computer program is provided which comprises instructions which, when executed on at least one processor, cause the at least one processor to carry out the method according to any one of the embodiments described herein.

In some embodiments a carrier containing the computer program is provided, wherein the carrier is one of an electronic signal, optical signal, radio signal, or computer readable storage medium.

Any specific terms that may have been employed herein are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), 3GPP New Radio (NR), 5G, UMTS, WiMax, and WLAN employing D2D communications may also benefit from exploiting the ideas covered within this disclosure.

With specific regard to NR systems it is noted that NR terminology and LTE terminology coincide to a considerable extent; for instance, a resource element (RE) remains 1 subcarrier×1 OFDM symbol. Yet some terms known in LTE have been given a new meaning in NR. Examples: An LTE subframe lasting 1 ms contains 14 OFDM symbols for normal CP. An NR subframe has a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to 3GPP TR 38.802 v14.0.0 and later versions.

Any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology, they remain fully applicable to NR technology.

The invention claimed is:

1. A method in a first device for coordinating a group transmission from a group of devices to a network node of a wireless telecommunications network, wherein group transmission comprises each device of the group of devices performing a joint transmission in a synchronized fashion to the network node, said group of devices including the first device and at least one other device, said method including:
   determining at least one condition relating to said group of devices and/or the group transmission;
   selecting one of relayed grant mode or direct grant mode based on the at least one determined condition;
   communicating said selected grant mode to at least one of said network node and the other devices of said group of devices;
   receiving a grant for uplink transmission from said network node;
   relaying said grant to the at least one other device if relayed grant mode is selected; and,
   responding to said grant by transmitting data to the network node as part of a group transmission.

2. A method as claimed in claim 1, wherein the at least one condition to be determined includes one or more of:
   a. the quality of the uplink and/or downlink between at least one device of the group of devices and the network node relative to a threshold;
   b. the size of the group of devices relative to a threshold;
   c. the type of traffic to be transmitted as part of a group transmission,
   d. the rate of uplink retransmission relative to a threshold
   e. receipt of a notification from one of the other devices of said group of devices, and
   f. receipt of a notification from said network node indicating one of a relayed grant mode or a direct grant mode.

3. A method as claimed in claim 1, wherein the determining the at least one condition includes: determining a non-detection by at least one of said other devices of the group of devices of a grant transmitted directly by said network node.

4. A method as claimed in claim 1, further including calculating a checksum of data to be transmitted as part of a group transmission held by the first device, wherein the determining the at least one condition includes: determining whether parity exists between said checksum and a further checksum received from at least one of said other devices of the group of devices and calculated on data to be transmitted as part of said group transmission held by said at least one other device.

5. A method as claimed in claim 1, wherein the step of selecting the relayed grant mode includes selecting a delay to be applied to said group transmission, the method further including the step of communicating the selected delay to said network node and to the other devices of said group of devices.

6. A computer program product comprising a non-transitory computer readable medium comprising instructions which, when executed on at least one processor, cause the at least one processor to carry out the method according to claim 1.

7. A device for coordinating a group transmission from a group of devices to a network node of a wireless telecommunications network, wherein group transmission comprises each device of the group of devices performing a joint transmission in a synchronized fashion to the network node, said group of devices including said device and at least one other device, the device comprising a processor and a memory, said memory containing instructions executable by said processor to control the operation of said device, said device being configured to:
 determine at least one condition relating to said group of devices and/or the group transmission,
 select one of a relayed grant mode or a direct grant mode based on the at least one determined condition,
 communicate said selected grant mode to at least one of said network node and the other devices of said group of devices;
 receive a grant for uplink transmission from said network node,
 relay said grant to the at least one other device of said group of devices if relayed grant mode is selected, and
 respond to said grant by transmitting data to said network node as part of a group transmission.

8. A device as claimed in claim 7, wherein said at least one condition includes:
 a. the quality of the uplink and/or downlink between at least one device of the group of devices and the network node relative to a threshold;
 b. the size of the group of devices relative to a threshold;
 c. the type of traffic to be transmitted as part of a group transmission,
 d. the rate of uplink retransmission relative to a threshold
 e. receipt of a notification from one of the other devices of said group of devices and
 f. receipt of a notification from said network node indicating one of a direct grant mode or relayed grant mode.

9. A device as claimed in claim 7, wherein the device is further configured to determine non-detection by at least one of said other devices of the group of devices of a grant transmitted directly by said network node.

10. A device as claimed in claim 7 wherein said device is further configured to:
 calculate a checksum of data queued in said first device for transmission as part of a group transmission,
 receive a further checksum from at least one of said other devices of the group of devices, said further checksum being calculated on data queued in said at least one other device for transmission as part of said group transmission, and
 determine whether parity exists between said checksum and said further received checksum.

11. A device as claimed in claim 7, further configured to select a delay to be applied to said group transmission in combination with selecting said relayed grant mode, and to communicate the selected delay to said network node and to the other devices of said group of devices.

* * * * *